United States Patent [19]

Muramatsu

[11] Patent Number: 5,452,108
[45] Date of Patent: Sep. 19, 1995

[54] IMAGE READING APPARATUS IN WHICH SCANNING DIRECTION OF READING SENSOR IS REVERSED IN RESPONSE TO EXCHANGE OF ORIGINALS

[75] Inventor: Hideo Muramatsu, Shinshiro, Japan

[73] Assignee: Minolta Camera Kabushiki Kaisha, Osaka, Japan

[21] Appl. No.: 160,940

[22] Filed: Dec. 2, 1993

[30] Foreign Application Priority Data

Dec. 4, 1992 [JP] Japan ................................ 4-325556

[51] Int. Cl.⁶ ............................................ H04N 1/04
[52] U.S. Cl. ........................... 358/474; 358/497; 358/498; 355/23; 355/24; 355/318; 355/319
[58] Field of Search ............... 358/474, 471, 494, 497; 355/320, 233, 235, 24, 25, 23, 318, 319, 320, 26

[56] References Cited

U.S. PATENT DOCUMENTS

| | | | |
|---|---|---|---|
| 4,422,100 | 12/1983 | Duvall et al. | 358/497 |
| 4,457,506 | 7/1984 | Ashbee et al. | 271/3.1 |
| 4,803,561 | 2/1989 | Kubota | 358/497 |
| 4,870,448 | 9/1989 | Miyake et al. | 355/235 |
| 4,903,139 | 2/1990 | Minter | 358/296 |
| 4,908,660 | 5/1990 | Ohira et al. | 355/206 |
| 4,910,612 | 3/1990 | Yamazaki | 358/496 |
| 4,937,612 | 6/1990 | Shogren | 355/235 |
| 5,026,044 | 6/1991 | Ryon et al. | 271/227 |
| 5,055,880 | 10/1991 | Fujiwara | 355/235 |
| 5,151,797 | 9/1992 | Nosaki et al. | 358/474 |
| 5,280,368 | 1/1994 | Fullerton | 358/497 |
| 5,282,050 | 1/1994 | Ishizuka et al. | 358/400 |

FOREIGN PATENT DOCUMENTS

| | | |
|---|---|---|
| 56-144668 | 11/1981 | Japan . |
| 61-66657 | 4/1986 | Japan . |
| 2-50862 | 2/1990 | Japan . |

*Primary Examiner*—Edward L. Coles, Sr.
*Assistant Examiner*—Madeleine Au Nguyen
*Attorney, Agent, or Firm*—Willian Brinks Hofer Gilson & Lione

[57] ABSTRACT

When an original fed by an original feeding portion is mounted at a predetermined position on a platen glass, a scanner starts traveling in one direction from its home position, and scans the original. When the scanner completes scanning, the original read out is discharged, and the next original is fed. However, the scanner does not return to its home position. The scanner is held at the position. When the next original is mounted at a predetermined position, the scanner travels in a direction opposite to a direction for the previous original from the position to carry out scanning.

5 Claims, 14 Drawing Sheets

IMAGE READING APPARATUS IN WHICH SCANNING DIRECTION OF READING SENSOR IS REVERSED IN RESPONSE TO EXCHANGE OF ORIGINALS

BACKGROUND OF THE INVENTION

1. Field of the Invention

The present invention generally relates to image reading apparatuses, and more particularly, to an image reading apparatus such as a digital copying apparatus, which once stores read image data in a memory, and then provides the image data therefrom.

2. Description of the Related Art

In a conventional digital copying apparatus with either a fixed platen glass or a mobile platen glass, the reading direction of a scanner with respect to an original, that is, the subscanning direction is always constant.

In such a conventional digital apparatus of, for example, a mobile scanner type, the subscanning direction is always constant with respect to the original. The scanner must carry out the return operation of once returning to its home position after reading out the original. Therefore, a motor driving the scanner whenever the scanner reads out the original is wastefully driven, which causes a temperature rise and an increase of power consumption. The return operation also increases a scanning time of the scanner required for one reading.

SUMMARY OF THE INVENTION

One object of the present invention is to read out originals efficiently in an image reading apparatus.

Another object of the present invention is to read out a plurality of originals at a high speed in an image reading apparatus.

A still another object of the present invention is to reduce driving energy of a scanner in an image reading apparatus.

In order to achieve the above objects, the image reading apparatus according to the present invention includes a holder holding an original, exchange means for exchanging the original on the holder, a sensor, which can travel in a reciprocative manner, for reading out an image of the original on the holder line by line on a forward route and backward route to provide image data corresponding to the read image, and direction reversing means for reversing the traveling direction of the sensor in response to original exchange by exchanging means.

The image reading apparatus structured as described above reverses the traveling direction of the sensor in response to original exchange, thereby making it possible to read out the original at high efficiency and a high speed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
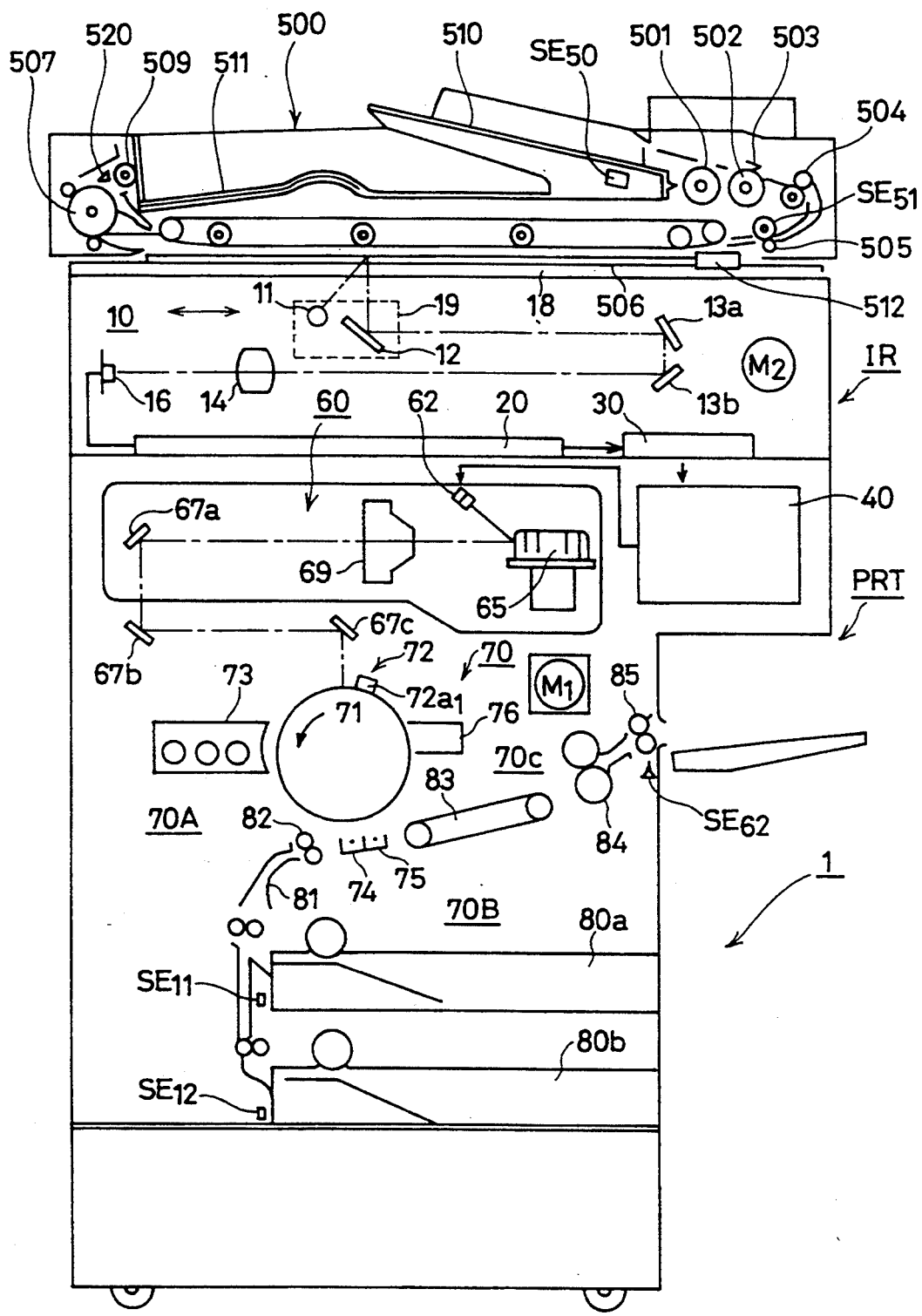
FIG. 1 is a cross section showing a structure of a digital copying apparatus according to one embodiment of the present invention.

FIG. 1 is a cross section showing the entire structure of a copying apparatus 1 according to one embodiment of the present invention.

In the figure, copying apparatus 1 includes a scanning system 10 reading out an original to convert the same into an image signal, image signal processing portion 20 processing the image signal transmitted from scanning system 10, memory unit portion 30 storing in a memory image data applied from image signal processing portion 20, an optical system 60 leading laser light from a semiconductor laser 62 to an exposure position on a photoreceptor drum 71 based on the image data provided from memory unit portion 30, and an image forming system 70 developing a latent image formed on photoreceptor drum 71 by exposure light, transferring the same onto a papersheet, and fixing the same to form an original image.

Image reader IR is structured of scanning system 10, image signal processing portion 20, and the like. A printer PRT is structured of a printing processing portion 40, optical system 60, image forming system 70, and the like.

Scanning system 10 includes an exposure lamp 11 and a first mirror 12 incorporated into a scanner 19 traveling under a platen glass 18, a second mirror 13a, a third mirror 13b, a condenser lens 14, a photoelectric converting element 16 using a CCD array or the like, and a scan motor M2.

Image signal processing portion 20 processes an image signal provided from photoelectric converting element 16, detects the paper size of the original or the like, and provides image data to memory unit portion 30. Memory unit portion 30 stores the image data.

Detailed description will be given later of image signal processing portion 20 and memory unit portion 30.

Printing processing portion 40 leads the image data transmitted from memory-unit portion 30 to semiconductor laser 62. Optical system 60 includes semiconductor laser 62, a polygon mirror 65 deflecting a laser beam, a main lens 69, and reflecting mirrors 67a to 67c.

Image forming system 70 includes a developing and transfer system 70A, a feeding system 70B, and a fixing system 70C.

Developing and transfer system 70A includes photoreceptor drum 71 rotationally driven in the counterclockwise direction of FIG. 1, and a corona charger 72, a developing unit 73, a transfer charger 74, a copy paper separation charger 75, and a cleaning portion 76 disposed in order from the upstream in the rotation direction in the periphery of photoreceptor drum 71.

A two-component developer of toner and carrier is housed in developing unit 73.

Feeding system 70B includes cassettes 80a and 80b housing papersheets, size detecting sensors SE11 and SE12 detecting the paper size, a papersheet guide 81, a timing roller 82, and a transport belt 83.

Fixing system 70C includes a fixing roller 84 heat-fixing and feeding a papersheet, a discharge roller 85, and a discharge detecting sensor SE62 detecting discharge of a papersheet.

Paper feeding portion 500 supplies an original from an original feed tray 510, feeds the original under transport belt 506, and discharges the original to an original discharge portion 511 through a discharge roller 509. Original feeding portion 500 also relates to control of reading of the original in synchronism with a scanning portion 19.

Description will now be given of a one side original mode and a duplex original mode, which are operation modes of the copying apparatus.

One Side Original Mode: Slider Scanning

When one side of each of originals is to be copied, the originals are set on original feed tray 510 with sides to be copied facing upward. If the operation is started, the set originals are supplied from the lowermost original by an original feeding roller 501. The original sorted by a sorting roller 502 and a sorting pad 503 passes through an intermediate roller 504. After the original is registered by a register roller 505, the original is fed onto platen glass 18 by transport belt 506. When the rear end of the original passes through the left end of an original scale 512, transport belt 506 slightly reverses and halts. As a result, the right end of the original contacts original scale 512 to be positioned precisely. At this time, scanner 19 stands by at the right end of platen glass 18. When feeding of the original is halted, motor M2 normally rotates, and scanner 19 initiates scanning for reading to the left direction in the figure. The original face is irradiated by light of original irradiating lamp 11, and the reflected light is read out by photoelectric converting element 16 through first mirror 12, second mirror 13a and third mirror 13b, and lens 14. When reading is completed, the original is traveled left by transport belt 506, U-turned by a reversing roller 507, passed above a reverse/discharge switching claw 520, and discharged to original discharge portion 511 from discharge roller 509.

Duplex Original Mode:

The original having one side already read out is once reversed by reversing roller 507. The original is passed under reverse/discharge switching craw 520 to be returned onto platen glass 18. The back side of the original is set. After the back side of the original is read out, the original is discharged to original discharge tray 511, similar to the case of the one side original mode.

Description will now be given of a control portion 100.

Figure 2:
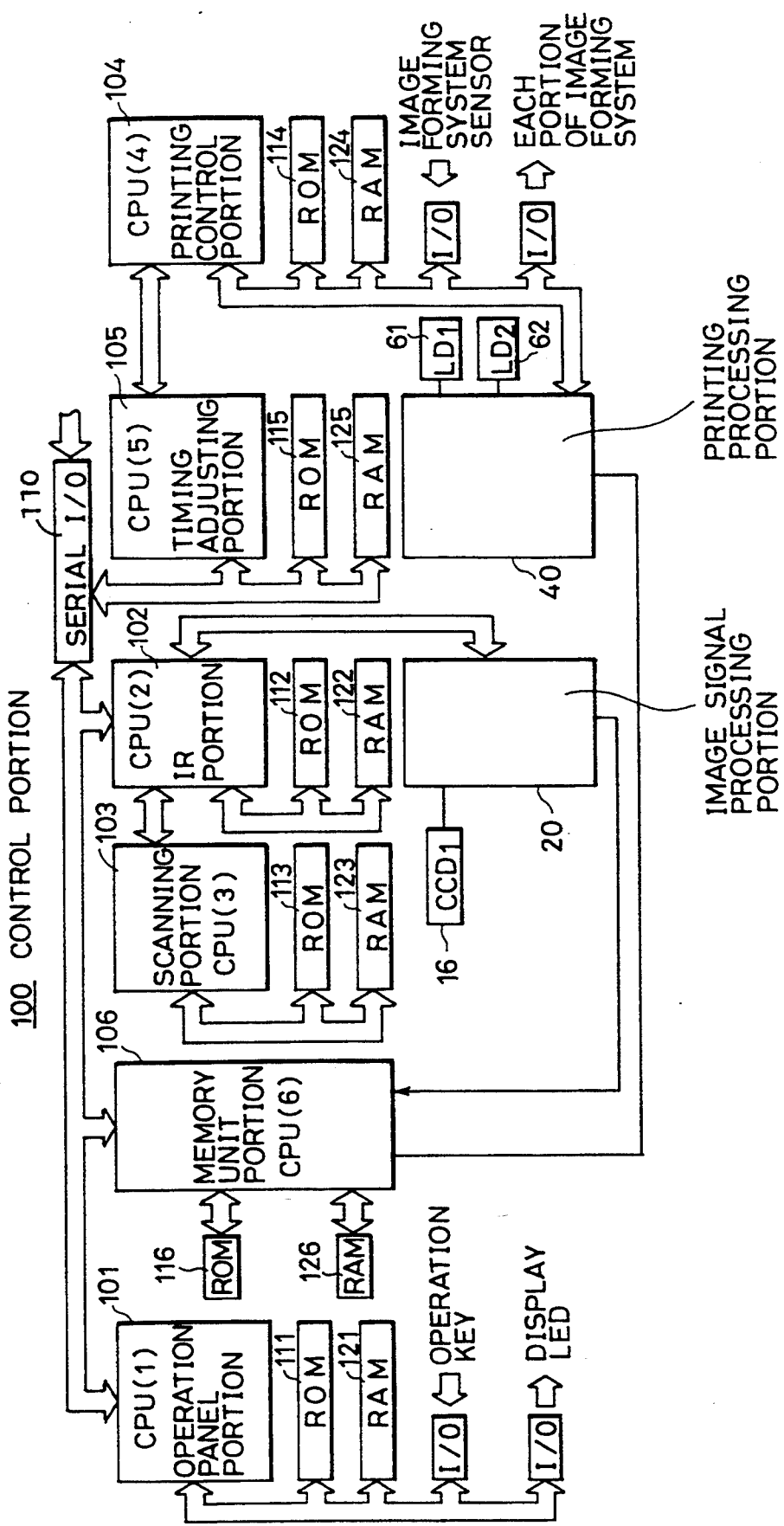
FIG. 2 is a system block diagram showing a configuration of a control portion in the copying apparatus of FIG. 1.

FIG. 2 is a block diagram showing a configuration of control portion 100 of copying apparatus 1 of FIG. 1.

Control portion 100 is mainly structured of six CPUs of CPU (1) 101 to CPU (6) 106. CPU (1) 101 to CPU (6) 106 include ROMs 111 to 116 having programs controlling respective operations stored therein, and RAMs 121 to 126 serving as a work area for program execution. CPU (6) 106 is provided in memory unit portion 30 of FIG. 1.

CPU (1) 101 carries out control relating to input and display of signals from various operation keys of the operation panel provided to the copying apparatus. CPU (2) 102 controls each portion of image signal processing portion 20, and gives instructions of scanning to CPU (3) 103. CPU (3) 103 drives and controls scanning system 10. CPU (4) 104 controls printing processing portion 40, optical system 60, and image forming system 70. CPU (5) 105 carries out processing for the overall timing adjustment of control portion 100 and setting of an operation mode.

CPU (6) 106 once stores in a memory (an image memory 204) image data read out by controlling memory unit portion 30, and reads out the same for output to printing processing portion 40.

A CPU (7) 107 controlling original feeding portion 500 is connected to control portion 100 through a serial I/O 110.

Figure 3:
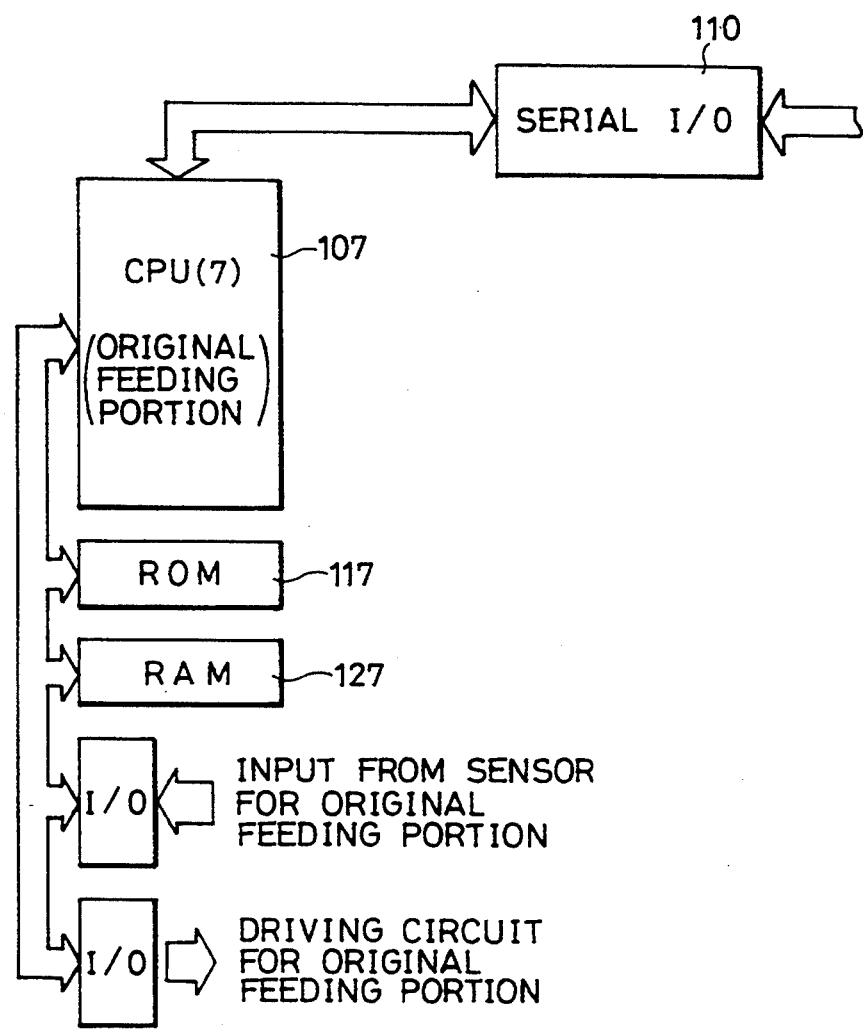
FIG. 3 is a system block diagram showing a configuration around a CPU controlling an original feeding portion of FIG. 1.

FIG. 3 is a block diagram showing a configuration around CPU (7) 107.

In the figure, around CPU (7) 107, an ROM 117 in which a program for controlling the operation is stored, and an RAM 127 serving as a work area for program execution are provided. The input from the sensor for the original feeding portion is applied through interface, while a control signal is provided through interface to a driving circuit for the original feeding portion.

Image reader IR and image signal processing portion 20 will now be described.

Figure 4:
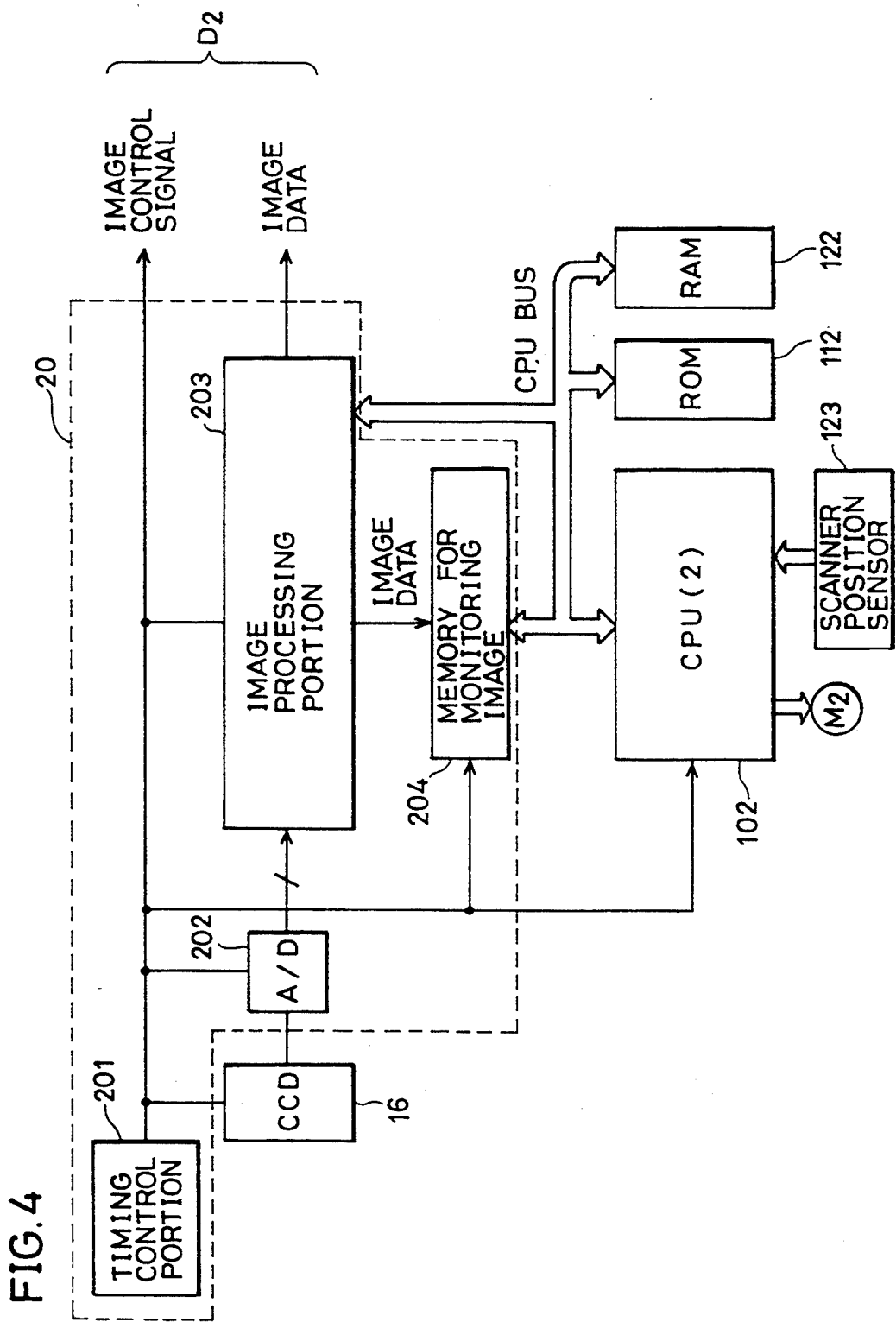
FIG. 4 is a system block diagram showing a configuration of an image reader IR and an image signal processing portion 20 of FIG. 1.

FIG. 4 is a block diagram showing the configuration of image reader IR and image signal processing portion 20.

Referring to the figure, an image reading synchronizing signal is supplied to each block by a timing control portion 201. CCD 16 generates an image reading signal by scanner 19 scanning the original in the main scanning direction. The generated analog signal is converted into a digital signal by an A/D converting portion 202 to be sent to an image processing portion 203.

In image processing portion 203, image quality correction such as shading correction, MTF (Modulation Transfer Function) correction, gamma correction and image processing such as variable-scale magnification, image editing are carried out, to supply image data to a printer engine portion or an image memory unit. A memory portion 204 for monitoring an image stores image data for one line in response to an instruction from CPU (2) 102. CPU (2) 102 receives output of a scanner position sensor 123, and carries out the entire control of the image reader, such as parameter setting to image processing portion 203, scan control by driving of scanner motor M2, and communication with host CPU (5) 105.

Figure 5:
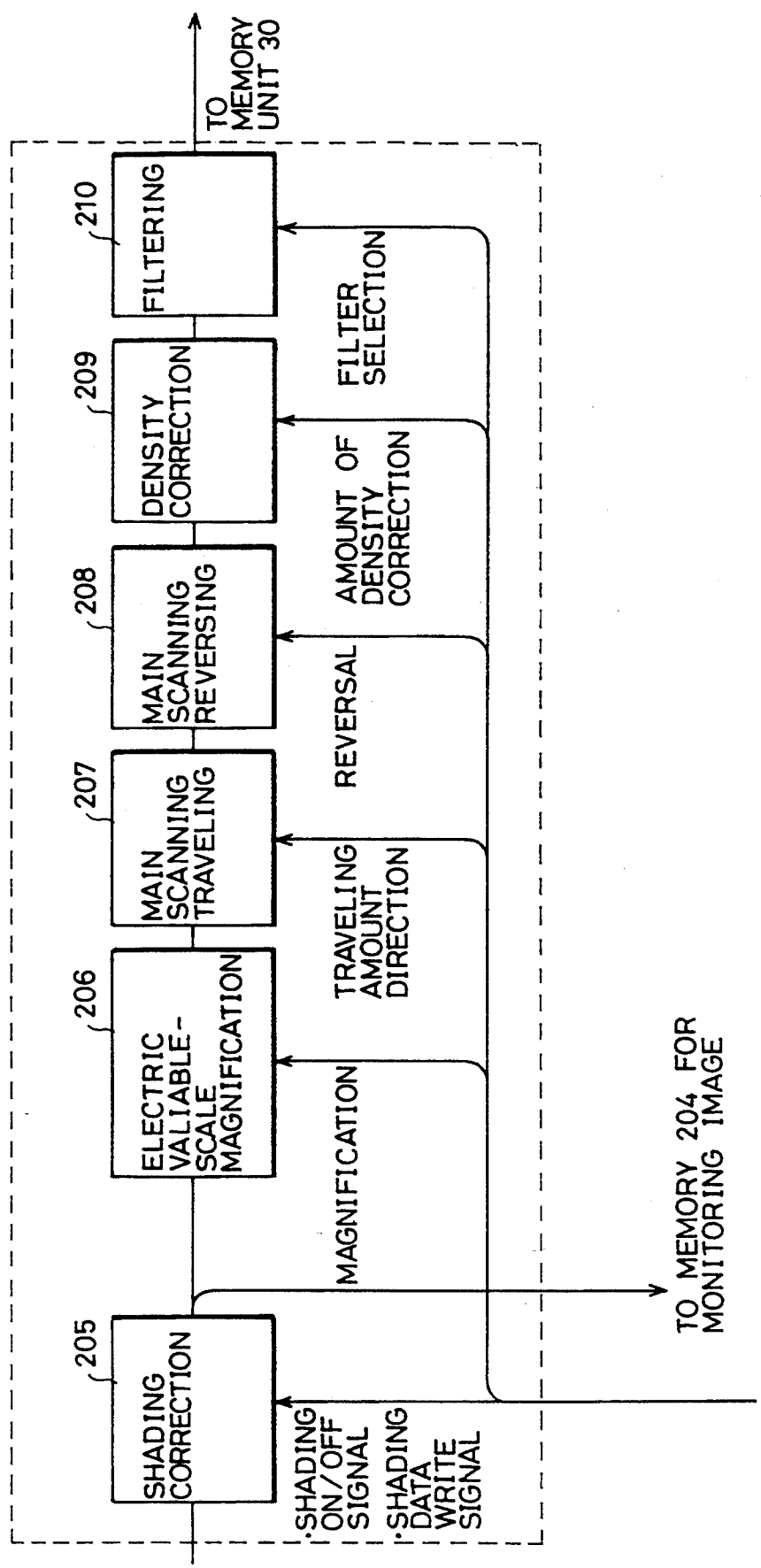
FIG. 5 is a system block diagram showing a configuration of an image processing portion of FIG. 4.

FIG. 5 is a diagram showing the configuration of image processing portion 203 of FIG. 4.

Function of each portion will be described hereinafter.

Shading correcting portion 205:

This portion corrects fluctuation of the main scanning direction caused by inequality in light quantity and dispersion of sensitivity of a reading element. In response to an ON/OFF signal of shading set by CPU (2) 102, a shading correction mode and a non-correction mode are set. At the time of adjustment of the CCD output, the non-correction mode is selected, and the CCD output is directly passed. The reading data after reading a reference white pattern is written in a shading RAM in response to a shading data writing timing signal.

Electric variable-scale magnifying portion 206:

This portion carries out variable-scale magnification (density conversion) in the main scanning direction of image data. The magnification is set by CPU (2) 102.

Main scanning traveling portion 207:

This portion shifts image data to the main scanning direction. In shifting the image data in order to ensure a binding margin (or traveling the image data to the main scanning direction in a traveling mode), the processing is carried out according to the amount and the direction of traveling set by CPU (2) 102.

Main scanning reversing portion 208:

This portion reverses the image data to the main scanning direction. More specifically, this portion reverses the image data in response to a reversing request signal applied from CPU (2) 102 in the case where a mirror image is to be obtained by normal scanning, or the case where an erect image is to be obtained by reverse scanning. In such the case, the reversing request signal is applied from CPU (2) 102.

Density correcting portion 209:

This portion carries out correction of background removal and density reproductivity. An amount of background removal and an amount of reproductivity correction (density gradient) are set by CPU (2) 102.

Filtering 210:

This portion carries out an edge enhancing processing, a smoothing processing and mixing of the processings. Selection of each filtering processing and the mixing ratio are set by CPU (2) 102.

A flow of image data in the above-described configuration will be described.

The image data from A/D converting portion 202 is introduced to a shading correcting portion 205. After shading correction, the image data is introduced to both of the above-described memory portion 204 for monitoring an image and electric variable-scale magnifying portion 206.

The image data introduced to electric variable-scale magnifying portion 206 is subjected to processings of main scanning traveling portion 207, main scanning reversing portion 208, density correcting portion 209 and filtering 210 in this order, to be then introduced to memory unit portion 30.

Figure 6:
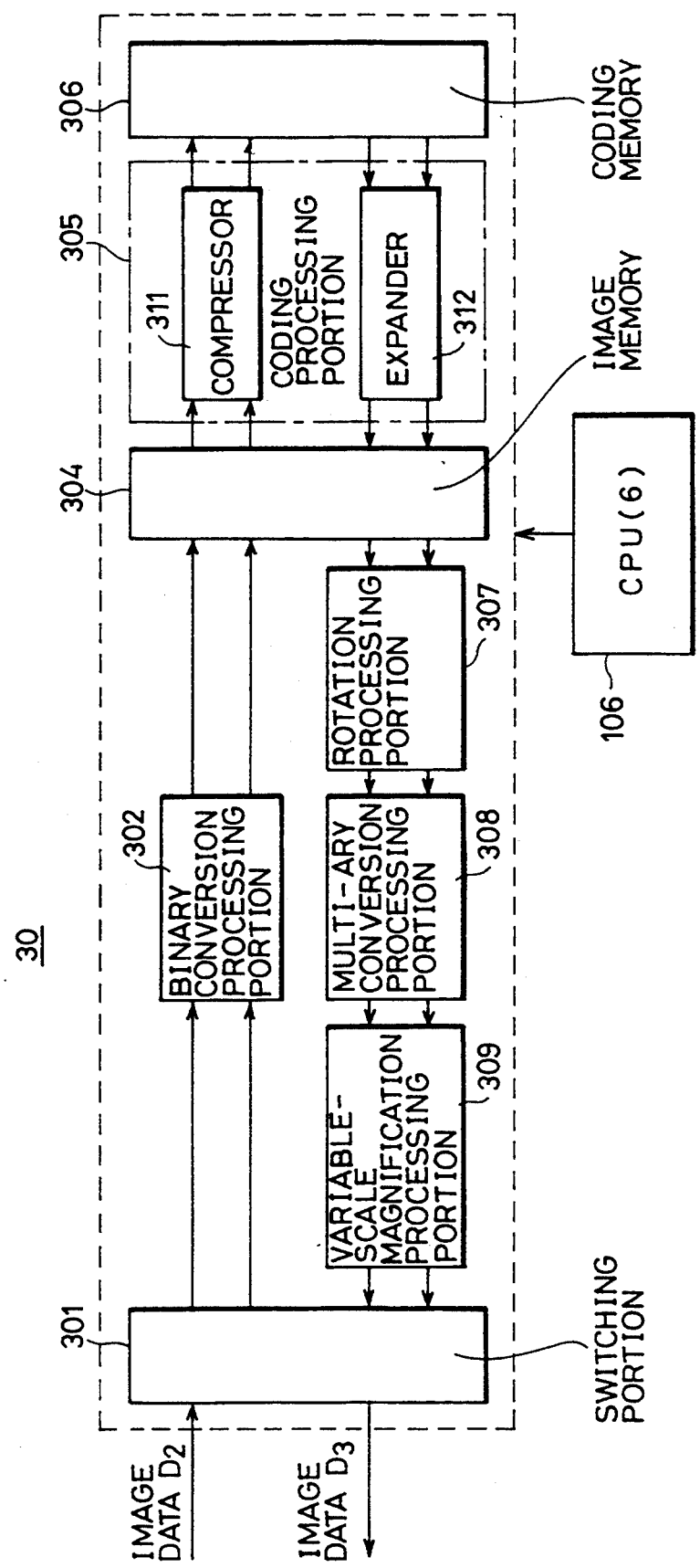
FIG. 6 is a system block diagram showing a configuration of a memory unit portion of FIG. 1.

FIG. 6 is a block diagram showing the configuration of memory unit portion 30 of FIG. 1.

Referring to the figure, memory unit portion 30 includes a switching portion 301 to which image data D2 from image signal processing portion 20 is applied, a binary conversion processing portion 302 producing binary data based on parameter setting from CPU (6) 106, multiport image memory 304 having a capacity of two pages of an A4-sized papersheet in 400 dpi, a coding processing portion 305 having independently operable compressor 311 and expander 312, a coding memory 306 having a multiport, a rotation processing portion 307, a variable-scale magnification processing portion 309, a multi-ary conversion processing portion 308 producing multi-ary data based on the parameter setting from CPU (6) 106, and CPU (6) 106 controlling all of them.

When image data D2 is written into image memory 304, coding processing portion 305 reads out and compresses the data to produce coding data, and writes the same into coding memory 306. In response to an instruction from CPU (6) 106, coding processing portion 305 reads out the coding data written into coding memory 306, expands the same to produce image data, and writes the same into image memory 304.

When image data for one page is produced in image memory 304 by expansion, the image data is subjected to rotation processing in rotation processing portion 307 as needed. Multi-array image data is produced in multi-ary conversion processing portion 308 to be variable-scale magnified at variable-scale magnification processing portion 309. The processed data is provided as image data D3 through switching portion 301. Compressor 311 and expander 312 can be operated independently from and in parallel with each other. Data is DMA (Direct Memory Access) transferred between compressor 311 and expander 312, and coding memory 306.

Figure 7:
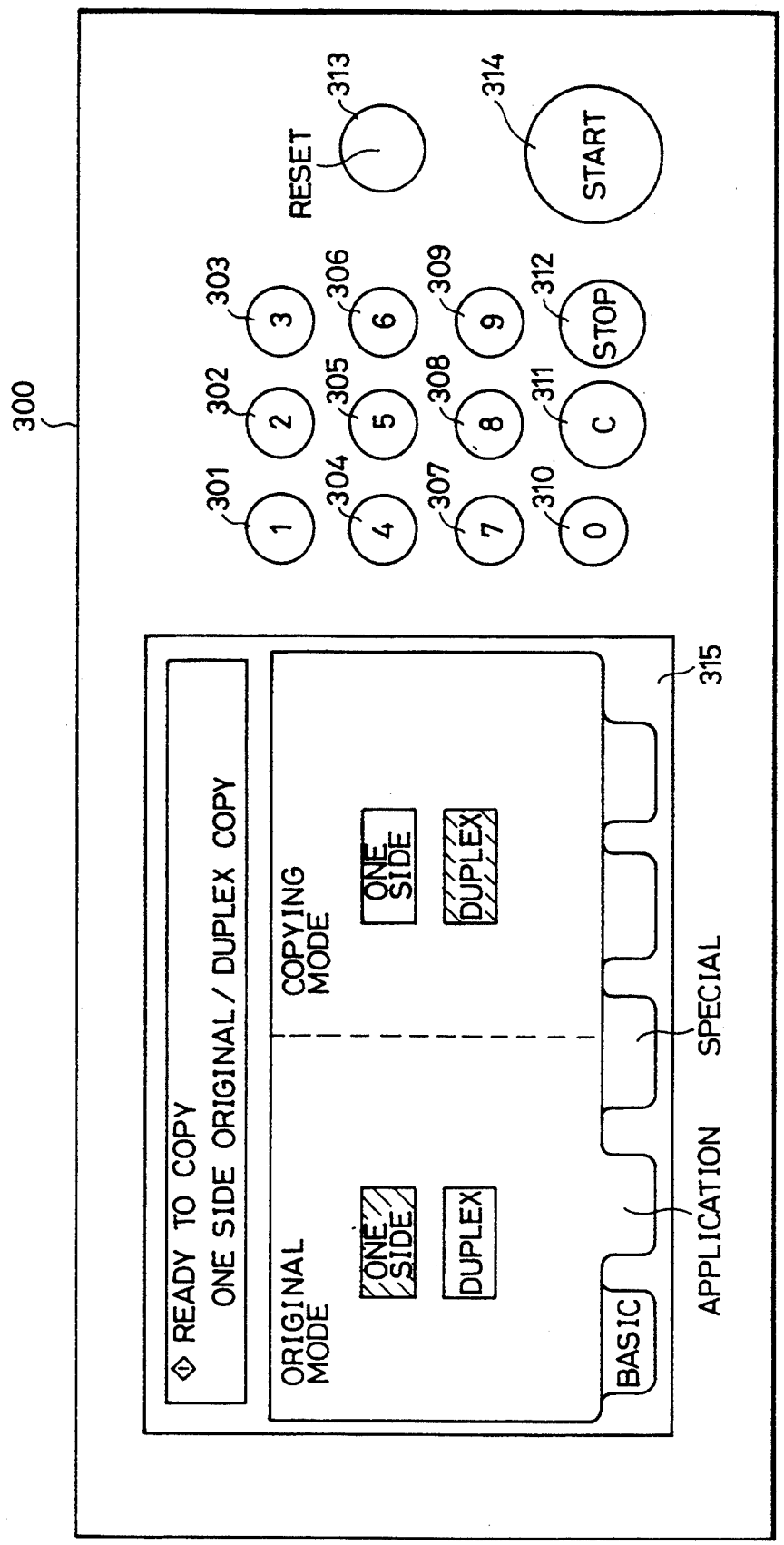
FIG. 7 is a plan view of an operation panel provided to the copying apparatus of FIG. 1.

FIG. 7 is a plan view of the operation panel provided to the copying apparatus of FIG. 1.

Referring to the figure, the operation panel includes ten keys 301 to 310 setting numbers, a clear key 311 clearing the numbers, a stop key 312 stopping the copying operation, a panel reset key 313 resetting the mode to an initial state, a start key 314 instructing start of the copying operation, an LCD setting a mode other than an initialization mode, and a touch panel 315 covering the surface of the LCD.

Functions of the copying apparatus to which one embodiment of the present invention is applied are roughly divided into three modes of a basic mode, an application mode, and a special mode. In respective modes, further mode setting is carried out by class picture display. More specifically, in each picture display, a function to be set by a touch panel varies.

The basic mode is a mode in which papersheet selection, magnification selection, adjustment of exposure level, or the like are carried out.

The application mode includes an original mode (one side, duplex), a copy mode (one side, duplex) and a discharge mode (sort, non-sort).

The special mode includes a binding margin mode, and a mirror image mode.

In FIG. 7, shown is a state where a "one side original/duplex copy mode" is selected in a picture display setting the original mode and the copy mode, which are application modes.

Figure 8:
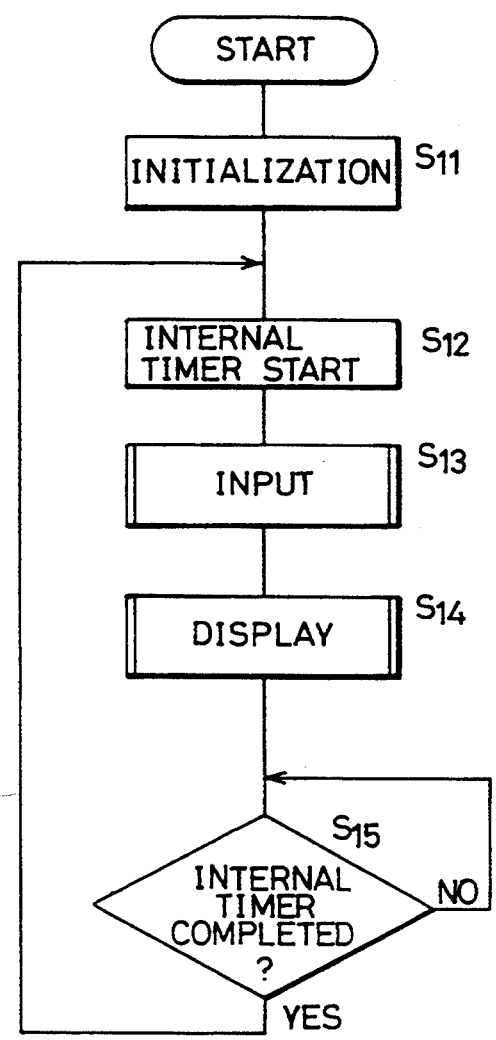
FIG. 8 is a control flow chart of a CPU 101 controlling the operation panel shown in FIG. 7.

FIG. 8 is a diagram showing a control flow chart of CPU (1) 101 controlling operation panel 300 shown in FIG. 7.

At step S11, initialization is carried out, and at step S12, an internal timer is started, whose completion is determined at step S15.

At step S13, input of keys and the touch panel on the operation panel is sensed. At step S14, the contents of the input sensed at step S13 are displayed on LCD 315 or the like.

The procedure returns to step S12 after the internal timer set at step S12 is completed (S15).

Figure 9:
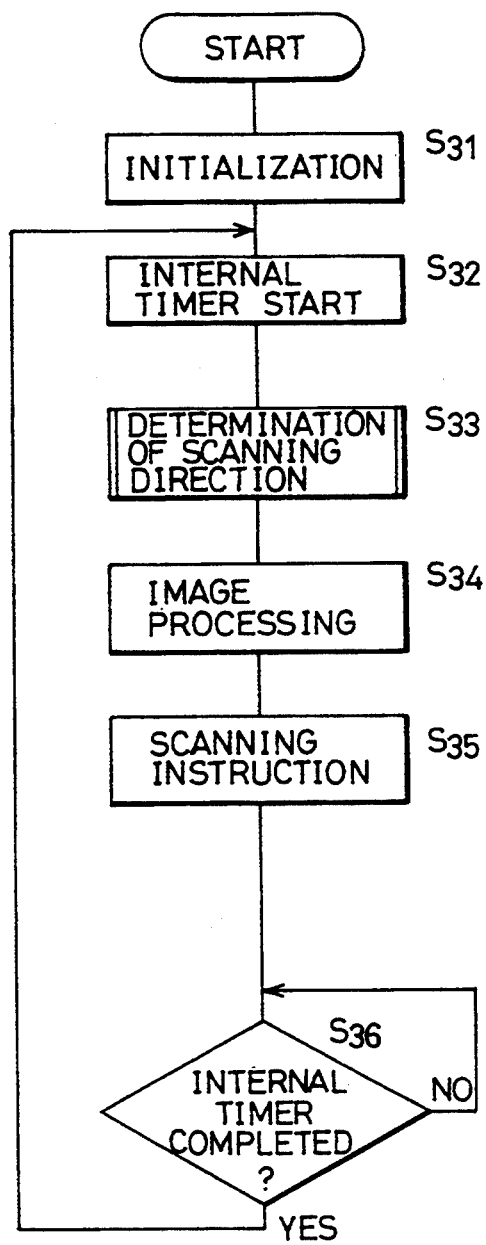
FIG. 9 is a control flow chart of a CPU 102 controlling image processing and scanning of the IR portion of FIG. 1.

FIG. 9 is a control flow chart of CPU (2) 102 controlling image processing and scanning of the IR portion of FIG. 1.

At step S31, initialization is carried out, and at step S32, an internal timer is started, whose completion is determined at step S36.

At step S33, the scanning direction of the scanner is determined according to the mode determined by CPU (1) 101. At step S34, instructions for each processing in the image processing portion shown in FIG. 5 are generated. If reverse reading of the scanner is set at step S33, for example, a reversing request is made out for a main scanning reversing block 208.

After the copying operation is actually initiated at step S34, the instruction to carry out the subscanning processing determined at step S35 is given to CPU (3) 103. At step S36, the procedure returns to step S32 after the internal timer is completed.

Figure 10:
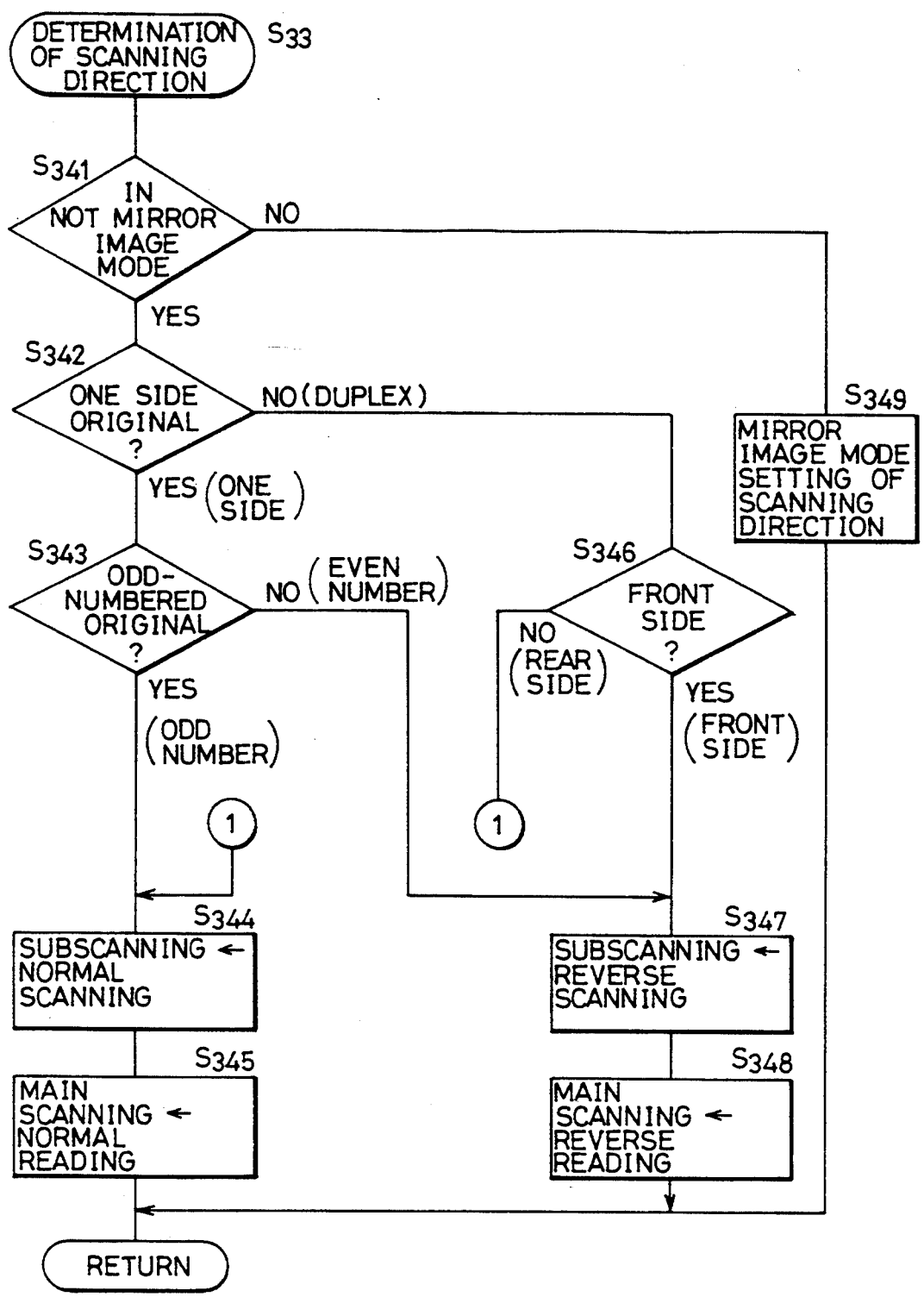
FIG. 10 is a flow chart showing specific contents of a scanning direction determination routine of FIG. 9.

FIG. 10 is a flow chart showing the specific contents of the scanning direction determination routine of step S33 of FIG. 9.

Description will be given of reverse scanning and the relationship between the reading direction and the output image in order to explain each step of the flow chart.

It is assumed that in FIG. 1, scanning of scanner 19 in the direction from right to left of the figure is normal scanning, and that scanning in the direction from left to right is reverse scanning.

Reading of the image data from image sensor 16 in such a scanning direction that output identical to the original image is obtained by normal scanning is defined as normal reading, and reading otherwise is defined as reverse reading. Upon such definition, the relationship between scanning and reading directions and the output image is as follows.

(1) When the image data in the main scanning direction read out by normal scanning is taken out by normal reading, the output image is identical to the original image.

(2) When the image data in the main scanning direction read out by normal scanning is taken out by reverse reading, the output image is a mirror image along an axial line in parallel with the main scanning direction.

(3) When the image data in the main scanning direction read out by reverse scanning is taken out by normal reading, the output image is a mirror image along the subscanning direction.

(4) When the image data in the main scanning direction read out by reverse scanning is taken out by reverse reading, the output image is identical to the original image. However, the order in which the image data is transferred to the memory is opposite. More specifically, when the image data is directly provided and printed, the output image is provided with 180° rotated with respect to the output image obtained by above (1).

Description will now be given of reverse scanning and the 180° rotation processing of the image data provided from the memory unit.

When an ADF (Automatic Original Feeder) is used, as to the above-described normal scanning and reverse scanning, the processing is selectively carried out as follows.

One Side Original:

After reading out an odd-numbered original by normal scanning, scanner 19 waits for setting of the next original at the position. When an even-numbered original is set, scanner 19 initiates reading by reverse scanning from the position. As a result, the wasteful return operation is omitted, a time required for the scanner ready for original reading can be shortened, and an amount of operation can be reduced. At the same time, load of the driving motor is reduced, the temperature increase of the motor is prevented and the power consumption is reduced. These effects can be obtained on the condition that the original size is detected by the ADF. More specifically, when the original size read out this time is different from the original size previously read out, the scanner must be traveled by the difference in the subscanning direction after normal scanning, which slightly deteriorates scanning efficiency.

Duplex Original:

The original is first reversed, and the back side of the original is set on the platen glass. After the original is read out by normal scanning, the original is again reversed, and the front side is set on the platen glass. At this time, the scanner stands by at a position where it completes reading of the original by normal scanning. From this position, the scanner initiates reverse scanning. After reading is completed, the original is discharged.

As described above, if normal scanning/normal reading and reverse scanning/reverse reading are alternately carried out to provide images directly, the output images are 180° rotated for every original.

Therefore, for the images obtained by reverse scanning/normal reading, the 180° rotation processing is carried out so that the image output is in the same direction as the direction of the image output by normal scanning/normal reading during transfer of the image data from the memory unit to the printer. As a result, it is possible to obtain printing output headed in one direction independent of the scanning direction.

Returning to the flow chart of FIG. 10, at Step S341, it is determined whether the operation mode is the mirror image mode for obtaining a mirror image. When the mode is not the mirror image mode but the one side original mode (YES at S342), and the original is an odd-numbered original (YES at S343), or when the mode is the duplex original mode (NO at S342), and the back side of the original is to be copied (NO at S346), the contents of scanning instruction are set to normal scanning (S344) and normal reading (S345). The set information is given to CPU (3) 103 at step S35 of FIG. 9.

On the other hand, when the mode is the one side original mode (YES at S342), and the original is an even-numbered original (NO at S343), or when the mode is the duplex original mode (NO at S342) and the front side of the original is to be copied (YES at S346), the contents of scanning instruction are set to reverse scanning (S347) and reverse reading (S348). The set information is given to CPU (3) 103 at step S35 of FIG. 9.

When the reverse reading is set, in the image processing at step S34, the reversing processing in the image processing portion of FIG. 5 is required for main scanning reversing portion 208. When the mode is the mirror image mode (NO at S341), the subscanning direction and the main scanning reading direction are set at step S349 according to designation of the axis of the mirror image or the like. The set information is given to CPU (3) 103 at step S35 of FIG. 9.

Figure 11:
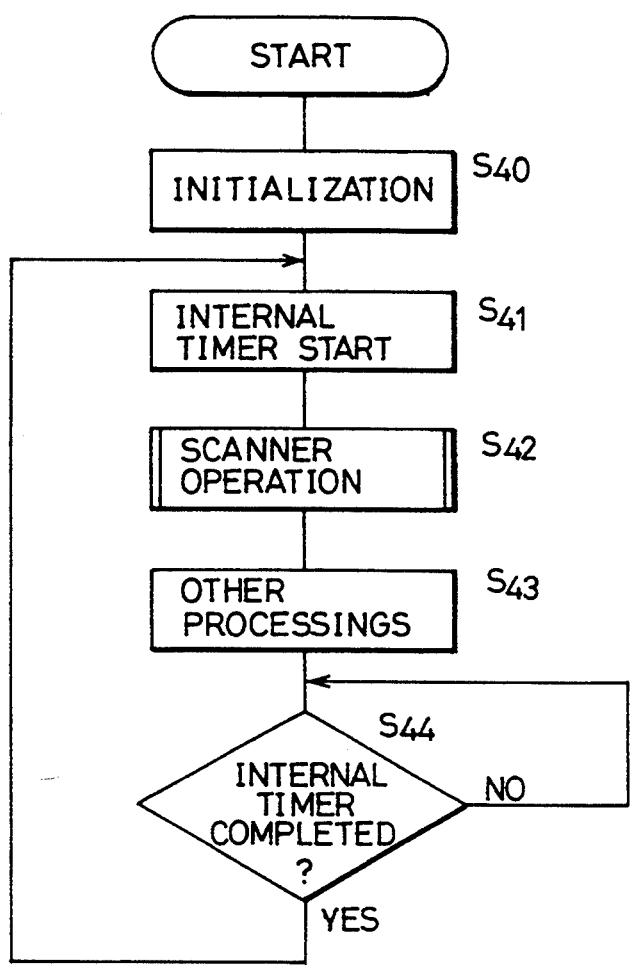
FIG. 11 is a control flow chart of a CPU 103 controlling a scanning system 10 of FIG. 1.

FIG. 11 is a control flow chart of CPU (3) 103 carrying out control of scanning system 10.

At step S40, initialization is carried out. At step S41, an internal timer is started, whose completion is determined at step S44.

At step S42, the operation of scanner 19 is controlled as will be described later. Then, after the other processings are carried out at step S43, the procedure returns to step S41 after the internal timer is completed at step S44.

Figure 12:
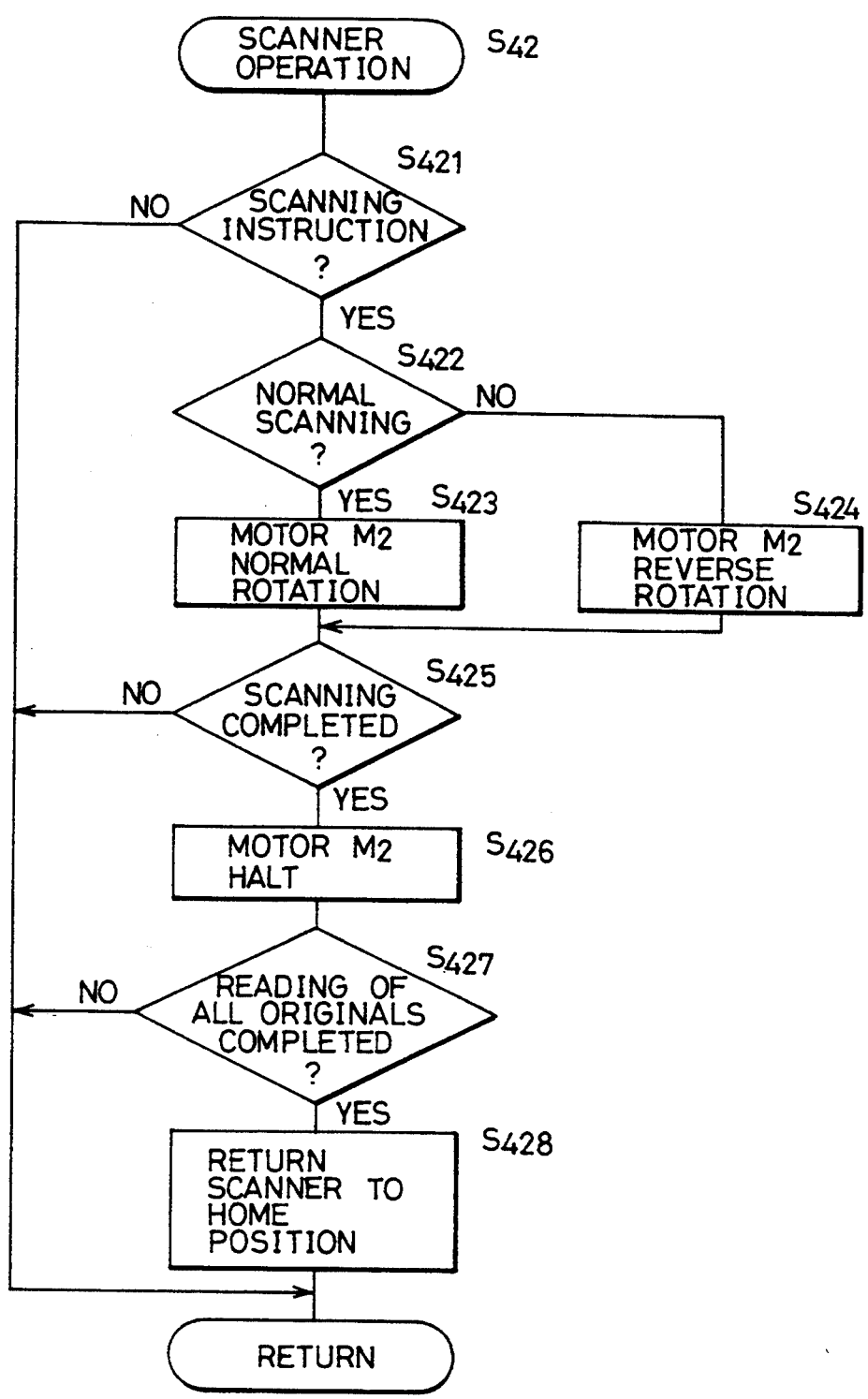
FIG. 12 is a flow chart showing specific contents of a scanner operation routine of FIG. 11.

FIG. 12 is a flow chart showing the specific contents of the scanner operation routine of FIG. 11.

At step S421, it is determined whether or not scanning by the scanner has been instructed from CPU (2) 102 at step S35 of FIG. 9. When the scanning instruction has been given, at step S422, it is determined whether the scanning direction is the normal scanning direction. In the case of normal scanning, at step S423, driving motor M2 of the scanner is normally rotated. On the other hand, in the case of reverse scanning, at step S424, driving motor M2 of the scanner is reversely rotated, and the reading operation of the original is carried out.

Then, at step S425, it is determined whether scanning by the scanner has been completed. If scanning has been completed, at step S426, driving motor M2 of the scanner is halted. At step S427, it is determined whether originals to be read have all been read out. If it is determined that reading of all originals is completed, at step S428, the scanner is returned to its home position and halted thereat.

More specifically, when all the originals to be read have not been read out, the procedure skips step S428. Therefore, the scanner does not return to its home position.

Figure 13:
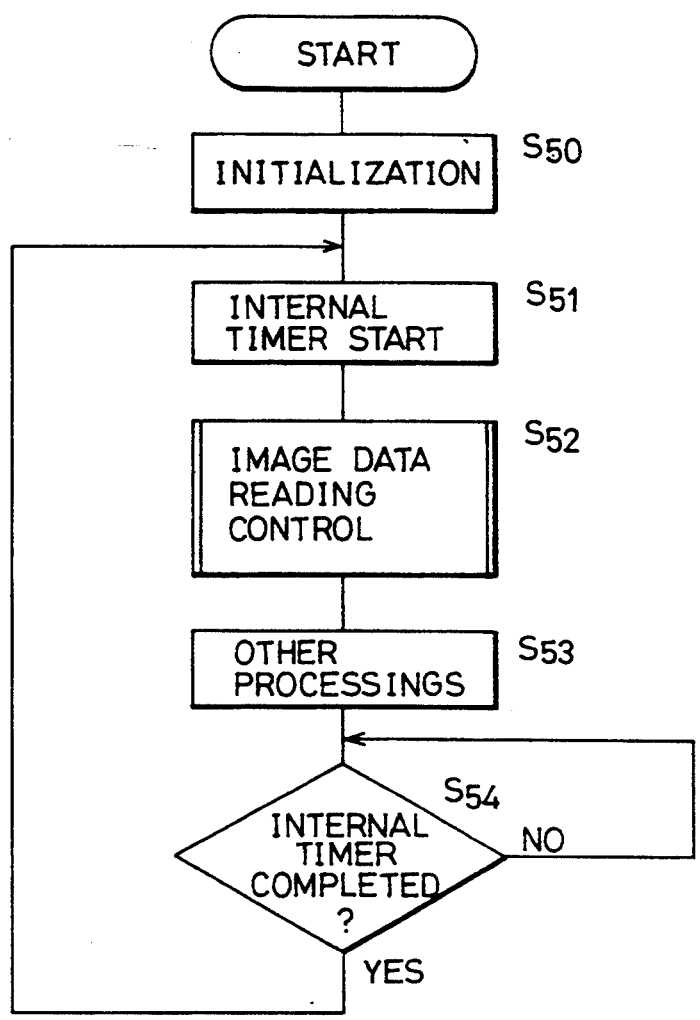
FIG. 13 is a control flow chart of a CPU 106 controlling a memory unit portion of FIG. 1.

FIG. 13 is a control flow chart of CPU (6) 106 carrying out control of the memory unit portion.

At step S50, initialization is carried out. At step S51, an internal timer is started, whose completion is determined at step S54.

At step S52, control for reading out data stored in the memory is carried out as will be described later. After the other processings are carried out at step S53, the procedure returns to step S51 after the internal timer is completed at step S54.

Figure 14:
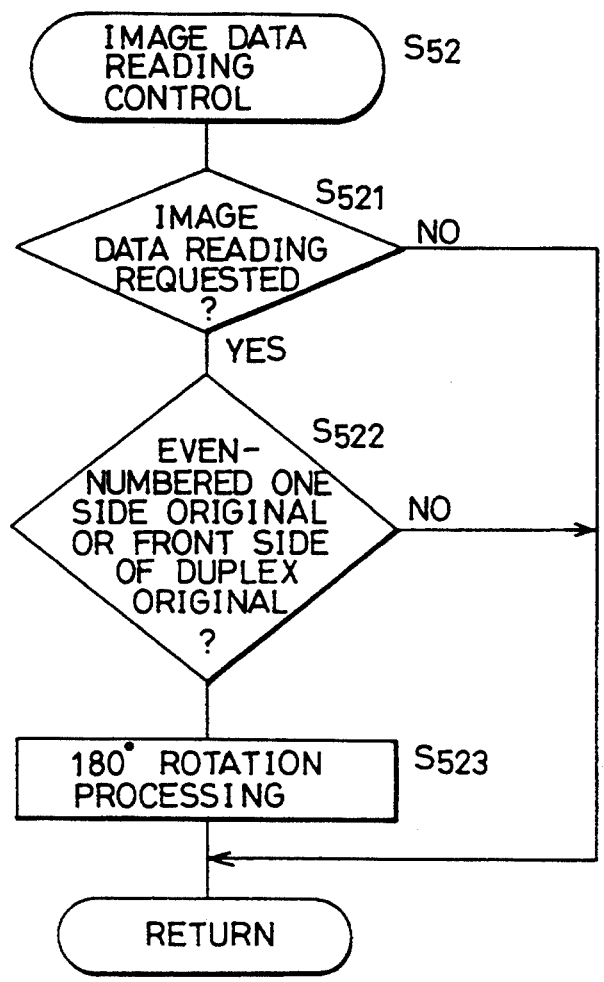
FIG. 14 is a flow chart showing specific contents of an image data reading control routine of FIG. 13.

FIG. 14 is a flow chart showing the specific contents of the image data reading control routine of FIG. 13.

At step S521, it is determined whether reading of the image data is requested. If reading of the image data is requested, at step S522, it is determined whether the requested image data is an even-numbered original in the one side mode or front side data in the duplex mode. In either case, at step S523, it is controlled such that the image data is read out from image memory 304 after 180° rotation in rotation processing portion 307 at the time of reading. On the other hand, in the case where the image data is an odd-numbered original in the one side mode or back side data in the duplex mode, the image data is directly read out without being rotated.

In the above-described embodiments, the present invention is applied to a digital copying apparatus in which a scanner which is a reading device is traveled with a platen glass fixed. However, the present invention can be applied to a digital copying apparatus of a type which travels mounted originals with a reading device fixed.

As described above, in the present invention, the direction of change of the relative position of the original and the reading device can be switched from one direction to the direction opposite thereto according to a predetermined condition. Therefore, it is not necessary to return the relative position of the original and the reading device to its home position after reading. It is possible to carry out the efficient reading operation.

In particular, in the image processing apparatus having an original feeding device, the copying efficiency is improved with the configuration unchanged. When a time required for feeding is shorter than a time required for the scanner returning to its home position, a time required for copying is shortened.

Furthermore, since there is no useless change of the relative position of the original and the reading apparatus, the power consumption of the driving system for changing the relative position is reduced, and the temperature increase can be minimized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:
   a holder holding an original;
   a tray housing a plurality of originals;
   feeding means for feeding onto said holder originals housed in said tray one by one;
   reversing means for reversing back and front of the original on said holder;
   a sensor which can travel in a reciprocative manner for reading out an image of the original on said holder line by line on a forward route and a backward route to provide image data corresponding to the image read out; and
   reversing control means for controlling said reversing means such that said reversing means reverses back and front of the original at a timing at which said sensor reverses the traveling direction from said forward route to said backward route.

2. The image reading apparatus as recited in claim 1, further comprising:
   feeding control means for controlling said feeding means such that the next original is fed onto said holder at a timing at which said sensor reverses the traveling direction from said backward route to said forward route.

3. An image reading apparatus, comprising:
   a tray housing a plurality of originals;
   a feeder which feeds originals supported on the tray one by one;
   a reversing device which reverses back and front of the original fed by said feeder;
   a sensor which senses light reflected from the original and outputs a signal corresponding to an intensity of the reflected light;
   a scanner which relatively and reciprocatively moves said sensor with respect to the original; and
   a controller which controls said scanner to change a traveling direction from a forward route to a backward route when said reversing device reverses back and front of the original.

4. An image reading apparatus, comprising:

a document table;

a tray housing a plurality of originals;

a feeder which feeds onto said document table originals housed in said tray one by one;

a reversing device which reverses back and front of the original fed on said document table by said feeder;

a scanner which can travel in a reciprocative manner for reading out an image of the original on said document table line by line on a forward route and a backward route to provide image data corresponding to the image read out; and a controller which controls a traveling direction of said scanner from said forward route to said backward route when said reversing device reverses back and front of the original on said document table.

5. The image reading apparatus as recited in claim 4, wherein said controller controls the traveling direction of said sensor from said backward route to said forward route when said feeder feeds a next original onto said document table.

* * * * *